July 5, 1932.   G. D. DODD   1,866,091
APPARATUS FOR TREATING LIQUIDS
Filed May 2, 1925
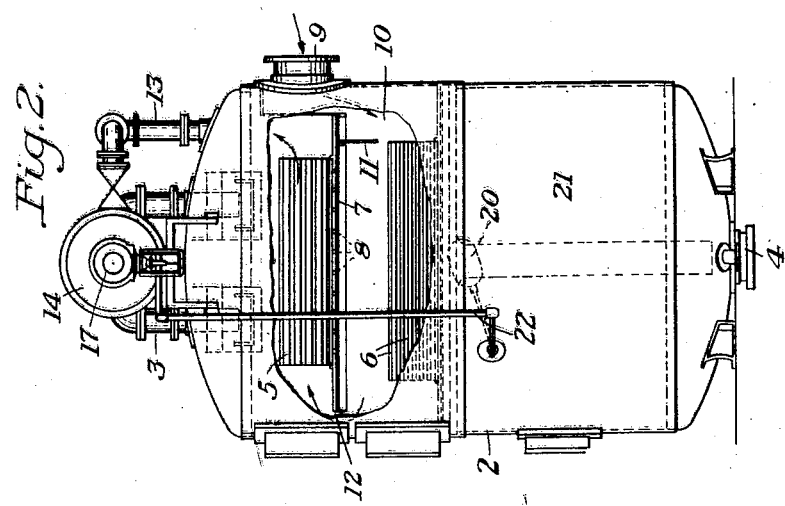
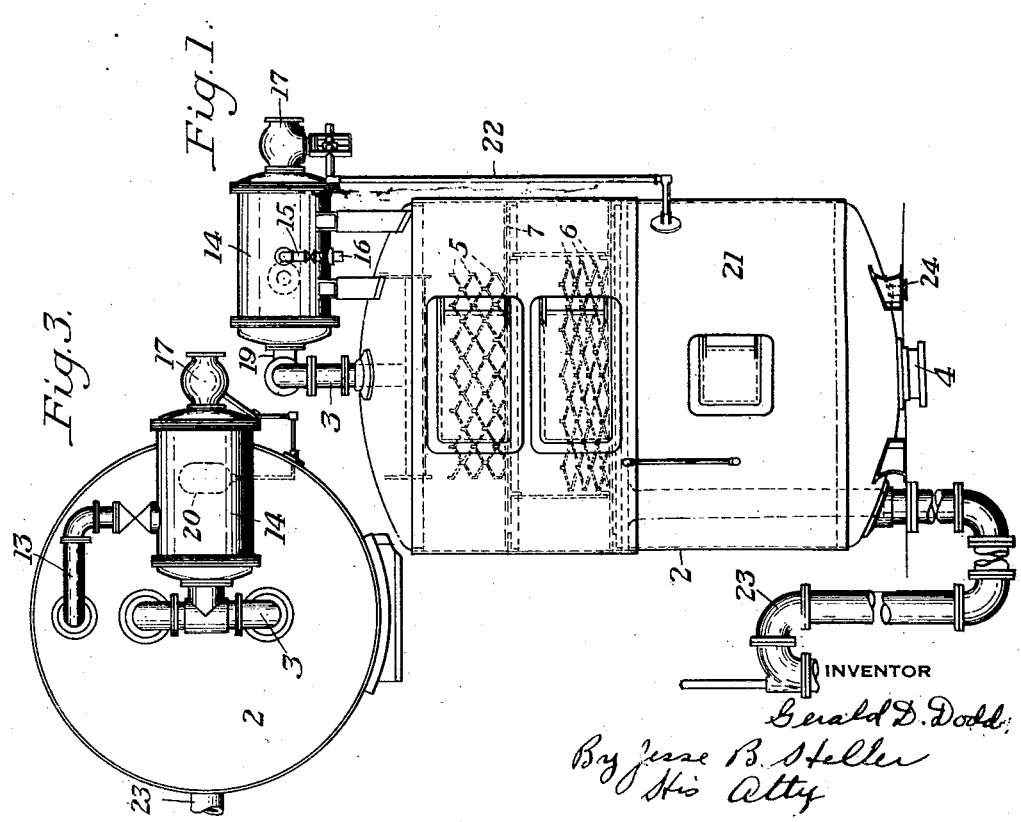
INVENTOR
Gerald D. Dodd
By Jesse B. Steller
His Atty Patented July 5, 1932

1,866,091

UNITED STATES PATENT OFFICE

GERALD D. DODD, OF OAKLYN, NEW JERSEY

APPARATUS FOR TREATING LIQUIDS

Application filed May 2, 1925. Serial No. 27,481.

The present invention relates broadly to degasifying or deaerating feed water, such, for example, as fed to boilers, economizers, and the like, and more particularly to a method and apparatus for effectively removing air and other entrained gases from water. The advantages of removing air and gases from water in order to decrease the scale or encrustation forming properties thereof, are commercially recognized and appreciated and the present invention provides an efficient method and apparatus by means of which such deaeration may be accomplished.

I am aware of the fact that heretofore it has been proposed to utilize heaters of the "through" or so called "thoroughfare" type, both in condensing and non-condensing plants. I am also aware that heaters of the induction type have been used in a similar manner. Each of these types of heaters is well known and inherently has certain desirable and definite characteristics. By a series of experiments I have found, however, that very desirable results may be obtained by combining these two types of heaters in a predetermined manner whereby the operation of one of the heaters is effective for modifying the operation of the other.

A so called "thoroughfare" heater is ordinarily distinguished by the characteristic of a through or thoroughfare flow of steam, it being customary in heaters of this type to supply thereto an amount of steam in excess of the requirements of the heater. It is apparent, therefore, that in a heater of this character it is possible to bring the temperature of the liquid approximately to the temperature of the steam utilized for heating, but that the heating is not efficiently accomplished for the reason that the excess of steam supplied to the heater is ordinarily vented.

An induction heater, on the other hand, is characterized by having an induced flow of steam which is substantially proportional to the amount of work being done, new steam for heating purposes being drawn into the heater as the previously supplied steam condenses. From a standpoint of efficiency, therefore, an induction heater is much more desirable than a thoroughfare heater for the reason that it utilizes substantially all of the steam supplied thereto.

I have found that each of these heaters possesses characteristics adapting the same for use in combination. It is understood that the air content dissolved in water is a function partly of the pressure and temperature of the water and partly of the air tension in the atmosphere in which the water is being treated or agitated. From a practical standpoint, the minimum air tension which can be secured in a heater is obviously the air tension of the incoming steam. This air tension of the supplied steam is practically negligible. It is inevitable, however, that any process of heating by condensation necessarily results in an increase in the non-condensible portion, which is the air.

If the two types of heaters are so combined that the thoroughfare heater operates under such conditions that the condensation of steam withdrawn is very slight, the air tension within such heater may be maintained at approximately the ideal limit which is the air temperature of the incoming steam, and therefore under such conditions the thoroughfare heater operates effectively for purposes of deaeration. I have found that by a combination of the two heaters in which the distribution of work is such that substantially all of the heating is accomplished in the induction heater, and this heated water is in turn supplied to the thoroughfare heater at substantially the temperature of the incoming steam, this ideal condition of a minimum air temperature in the thoroughfare heater, and consequent efficient deaeration therein, is made possible. This is true for the reason that under such conditions the thoroughfare heater has the two fundamentals of high temperature, desirable for effecting or insuring the necessary change of phase to the desired extent of the water being treated therein, and low air tension equivalent to that of the air tension of the heating steam.

In the preferred embodiment of my invention, I preferably so operate the heaters that the water flows first into the induction heater or compartment wherein it is heated to the desired temperature and thereafter passes to the thoroughfare heater or compartment, the steam on the other hand passing in the opposite direction, it being supplied initially to the thoroughfare heater wherein it contacts with water at substantially its own temperature and thereafter is drawn into the induction heater wherein the major portion of the heating is accomplished. In the operation of such an installation, I have found that it is highly desirable to so control the paths of flow of the steam and water that during the passage of the vapors and gases from the thoroughfare heater into the induction heater, they are maintained substantially out of direct contact with the water passing in the opposite direction. This absence of direct contact of the character herein contemplated will preferably be obtained by providing distinct flow paths for the liquid and for the vapor and gases, these separate flow paths conveniently being provided by carrying the vapors and gases from the thoroughfare heating section or compartment outside of the normal boundary of the heating zone therein and thereafter causing the same to enter into the heating zone of the induction section or compartment.

In the accompanying drawing I have shown, for purposes of illustration only, a preferred embodiment of the present invention, it being understood that the drawing does not define the limits of my invention, as changes in the construction and operation disclosed therein may be made without departing from the spirit of the invention or the scope of my broader claim.

In the drawing:

Figure 1 is a side elevation of one form of apparatus embodying the present invention;

Figure 2 is a side elevation of the apparatus shown in Figure 1, this view, however, being taken at substantially right angles to the view shown in Figure 1 and being partly broken away for the purpose of illustrating a portion of the interior of the apparatus; and Figure 3 is a top plan view of the apparatus shown in Figures 1 and 2.

In carrying out the present invention, the desired results may be accomplished by utilizing a thoroughfare heater and an induction heater, each constituting a unit and having the desired connections therebetween, or by so combining the two heaters in a common unit that the desired operations are performed therein. It will be understood, therefore, that in construing the specification and claim, the terms "thoroughfare" heater and "induction" heater are not to be construed as definitive of structural limitations as to assembly or otherwise.

Conveniently, I may provide an apparatus comprising a shell 2 having a liquid inlet 3 at its upper portion and a liquid outlet 4 at its lower portion. It will be understood that liquid to be treated may be supplied through the connection 3 and that treated liquid may be withdrawn as desired through the connection 4 in accordance with any desired practice.

Within the upper portion of the shell 2, I provide a series of trays 5, these trays constituting the tray section for the induction heater or compartment. Below the trays 5 is a second set of trays 6 constituting the tray section for the thoroughfare heater or compartment. The tray sections in the two compartments are preferably separated by means of a plate 7 having perforations 8 therein, permitting the passage of liquid from the tray section of the induction heater to the tray section of the thoroughfare heater but preventing a flow of steam in the opposite direction.

Provided at any desired point, preferably adjacent the upper portion of the shell 2 is a steam inlet 9 delivering steam to a downwardly opening passage 10 formed by a baffle 11 cooperating with the plate 7 to thereby cause the supplied steam to pass downwardly to a point opposite the tray section 6 and thereafter flow laterally through this tray section. In operation the excess of steam will be supplied to the connection 9, this steam passing horizontally through the tray section 6 and sweeping with it any air released within the thoroughfare heater. Thereafter the steam, together with its entrained air, rises vertically through a port 12 preferably at the side of the heater opposite that at which the steam enters. By reference more particularly to Figure 2 of the drawing, it will be noted that the port 12 is located outside of the boundary defined by imaginary vertically extending planes including the tray sections 5 and 6. By reason of this location of the port 12, the vapor and gases passing from the de-aerating tray section 6 to the heating tray section 5 are maintained out of direct contact with the liquid passing in the opposite direction through the perforations in the plate 7. This feature of the invention, irrespective of the exact location of the port 12 or manner of obviating direct contact as referred to, is highly important, as I have found that where the construction of the heater is such as to permit a passage of the vapor and gases upwardly in direct contact with the liquid passing in the opposite direction it is impossible to provide distinct zones in which temperature conditions can be maintained having such characteristics that effective heating is accomplished in one and effective deaeration in the other. Where the vapors and gases are in contact during their travel from one tray section to the other with the liquid, there is provided in effect a continuous heater in which the temperature of the water or other liquid being treated rises by successive increments as distinguished from the provision of separate zones of the character desired for the production of the effective degasification or deaeration of water. This operation also involves the inherent advantage of maintaining the liquid during its passage from the induction heater to the thoroughfare heater out of such relation to the vapors and previously released air as would result or tend to result in the reabsorption or the entrainment of a portion of such released air. It therefore becomes apparent that by providing separate passages as herein contemplated, the liquid is supplied to the thoroughfare heater with a lower volume of air either dissolved or entrained than would be possible in an operation in which a direct contact was permitted.

The operation before described also involves additional advantages from the standpoint of effective operation and from the standpoint of the construction of the apparatus. Mechanically, certain problems are inherently tied up with the passage of steam through sheets or bodies of water in a direction opposite to the direction of flow of the water. It will be appreciated that the flow of steam from the thoroughfare heater to the induction heater should be entirely in accordance with the demands of the induction heater. Therefore, the flow passages provided for the passage of steam and liquid, provided such passages are common, must be accurately proportioned with respect to the volume of liquid and to the volume of steam so that the steam velocity will not reach a point at which it will tend to prevent the passage of water into the thoroughfare heater or tend to back up this water into the tray section of the induction heater. On the other hand, the provision of separate flow paths assists in the maintaining of the desired difference in the air tensions in the two heaters. As pointed out, it is contemplated that the apparatus will function with a higher air tension in the induction heater than that which exists in the thoroughfare heater, a low tension in the thoroughfare heater being essential to its effective operation as a deaerating means. Where a separate flow path or paths are provided, as herein contemplated, a relatively higher velocity may be maintained through the path provided for the passage of the vapor and gases, without any tendency to produce an objectionable back pressure of the character before referred to and at the same time high enough to prevent a tendency toward an equalization of the air tensions in the two heaters by reason of diffusion from the induction heater to the thoroughfare heater.

In the operation of apparatus of this character, it is necessary to provide a vent from the induction heater primarily for the purpose of permitting the escape of the non-condensible gases released by the condensation of the heating medium in the induction heater. Inevitably, however, at least a small proportion of steam passes through this vent with the non-condensible gases. In accordance with the present invention, I provide a vent 13 leading to a condenser 14 preferably of the surface type. This condenser may be constructed in accordance with any well known designs and of proportions such as to effectively reclaim the heat of the vapors and gases escaping through the vent 13. The vapor space of the condenser may be provided with an air outlet 15 for the release of the air and with a drain 16 for the escape of the condensate. This condensate may be carried to any desired point, it being possible if desired to return the same directly to the apparatus.

Preferably, the heat of the vapors and gases through the vent is used for preheating the liquid being treated, and for this purpose the vent condenser 14 may be provided with a water inlet 17 and with an outlet 19 directly connected to the inlet connection or connections 3. By this construction, the temperature of the entering liquid is raised by an amount substantially equal to that of the heat released in the condenser.

In actual operation, the demand on the apparatus may vary from a minimum to a maximum and it is therefore desirable to provide automatic controlling means of such nature that the supply of liquid will be in direct relation to the demands for treated liquid on the apparatus. For this purpose the inlet 17 may be provided with a controlling valve adapted to be operated by the float 20 in the storage chamber 21 of the shell 2, the float operating through the linkage 22 to close the valve and restrict the supply of liquid as the liquid level in the storage chamber rises.

For purposes of safety, the storage chamber may be provided with an overflow connection 23 leading to a sump, tank, hot well, or the like. The shell 2 may also be provided with suitable blow-off openings 24 by means of which it may be cleaned as desired. The apparatus may also be provided, as well understood in the art, with suitable gages and pressure releases.

In operation the entering liquid will be preheated in the vent condenser and will thereafter pass into the induction heater and over the trays of the tray section 5 wherein it will be heated substantially to the temperature of the heating medium. Thereafter, the heated liquid passes downwardly into the thoroughfare heater and onto the trays of the tray section 6. In the thoroughfare heater definite conditions as to temperature, pressure and lower air tension are maintained, thereby effectively causing the deaeration of the liquid. The released air is swept out of the tray section by the action of the steam flowing in the paths indicated by the arrows and carried thereby out of contact with the downcoming liquid, into the induction heater. This air is in turn released by means of the vent and the heat recovered in the vent condenser.

It will be understood that the liquid supplied to the inlet 17 may be at any desired temperature, either representing the temperature of the source of supply or an increased temperature as produced by intermediate heating means.

The advantages of the present invention arise from the provision of a combination of heaters in such manner that the induction heater serves to maintain low air tension in the thoroughfare heater, whereby the thoroughfare heater may effectively operate from a standpoint of deaeration.

Further advantages arise from a construction embodying separate flow paths for the vapors and gases and for the liquid, whereby during the passage of the two from one of the heaters to the other they are maintained out of direct contact, thereby overcoming re-absorption of the air, entrainment of the air, back pressure of the liquid or tendency toward equalization of the air tensions in the two heaters, as well as from the comparative ease of design permitted by reason of such separate paths.

I claim:

Apparatus for heating and deaerating water, comprising a tank, a bank of open ended and open sided water spreading trays located in an upper portion of the tank, water supply means discharging onto the top of said bank of trays, a second bank of similar water spreading trays located in an intermediate portion of the tank beneath the first mentioned trays and receiving water at its upper end from the upper bank of trays in divided streams distributed over substantially the entire area of the upper end of the tray bank, both of said tray banks being constructed to permit a substantially horizontal steam flow therethrough in a plurality of superimposed substantially parallel strata, means responsive to the accumulation of water in a lower portion of the tank for regulating said water supply means so as to maintain a water level in the tank below the lowermost bank of trays, means for supplying steam to the intermediate portion of the tank in which the lower bank of trays is located so as to obtain a substantially horizontal steam flow therethrough in superimposed strata, and baffle means located substantially outside of the tray bank area and out of the path of water passing from the upper trays onto the lower bank of trays for guiding the flow of steam passing through the upper trays and effective in normal operation to normally prevent downflow of steam from the space surrounding the upper trays, and means for withdrawing air from the upper portion of said tank.

In testimony whereof I have hereunto set my hand.

GERALD D. DODD.